(12) United States Patent
Brun et al.

(10) Patent No.: US 9,407,595 B2
(45) Date of Patent: Aug. 2, 2016

(54) METHOD OF NOTIFICATION BY AN INVITER OF AN INFORMATION ON A PAGE OF AN ADVERTISER'S SERVER

(75) Inventors: Philippe Brun, Marcy L'Etoile (FR); Pierre-Amaury Brun, Marcy L'Etoile (FR); Thierry Juillot, Marcy L'Etoile (FR); Francois Mireaux, Marcy L'Etoile (FR)

(73) Assignee: ORGANDIA, Marcy l'Etoile (FR)

( * ) Notice: Subject to any disclaimer, the term of this patent is extended or adjusted under 35 U.S.C. 154(b) by 0 days.

(21) Appl. No.: 14/006,161

(22) PCT Filed: Mar. 19, 2012

(86) PCT No.: PCT/EP2012/054820
§ 371 (c)(1),
(2), (4) Date: Dec. 2, 2013

(87) PCT Pub. No.: WO2012/126890
PCT Pub. Date: Sep. 27, 2012

(65) Prior Publication Data
US 2014/0129346 A1 May 8, 2014

(30) Foreign Application Priority Data

Mar. 24, 2011 (FR) .................................... 11 52455

(51) Int. Cl.
*G06Q 30/00* (2012.01)
*H04L 12/58* (2006.01)
(Continued)

(52) U.S. Cl.
CPC .......... *H04L 51/32* (2013.01); *G06F 17/30899* (2013.01); *G06Q 10/10* (2013.01); *G06Q 10/107* (2013.01); *G06Q 30/0269* (2013.01); *G06Q 50/01* (2013.01)

(58) Field of Classification Search
CPC .................................................. G06Q 30/0269
USPC ...................................................... 705/14.66
See application file for complete search history.

(56) References Cited

U.S. PATENT DOCUMENTS

| 2005/0216300 A1* | 9/2005 | Appelman | G06Q 10/10 705/319 |
| 2008/0033739 A1* | 2/2008 | Zuckerberg et al. | 705/1 |

(Continued)

OTHER PUBLICATIONS

Licklider, "Man-Computer Symbiosis", Transactions on Human Factors in Electronics, vol. HFE-1, pp. 4-11, Mar. 1960.*

(Continued)

*Primary Examiner* — Amanda Abrahamson
*Assistant Examiner* — Scott C Anderson
(74) *Attorney, Agent, or Firm* — Nixon & Vanderhye P.C.

(57) ABSTRACT

The invention concerns a method of notification by an inviter of information on a page of an advertising server to at least one contact of the inviter. A sharing server:
- receives (E403) a message from a device used by the inviter after loading of the page of the advertiser's server by the device used by the inviter,
- obtains (E405), from a social network server, information identifying at least one contact of the inviter who is currently connected to the social network server,
- transfers (E406) each information obtained and identifying at least one contact to the device used by the inviter,
- receives (E407), from the device used by the inviter, information identifying at least one contact selected by the inviter,
- transfers (E408) a message destined for the selected contacts, the message comprising at least one address relating to the page loaded by the device used by the inviter.

5 Claims, 4 Drawing Sheets

(51) Int. Cl.
*G06F 17/30* (2006.01)
*G06Q 10/10* (2012.01)
*G06Q 50/00* (2012.01)
*G06Q 30/02* (2012.01)

(56) References Cited

U.S. PATENT DOCUMENTS

2009/0144392 A1  6/2009  Wang et al.
2010/0069095 A1* 3/2010  Yahav et al. .................. 455/466
2010/0070899 A1  3/2010  Hunt et al.

OTHER PUBLICATIONS

English-language translation of Written Opinion of the International Searching Authority for PCT/EP2012/054820 mailed Oct. 12, 2013.
International Search Report for PCT/EP2012/054820 mailed Apr. 24, 2012.
Written Opinion of the International Searching Authority for PCT/EP2012/054820 mailed Apr. 24, 2012.

* cited by examiner

METHOD OF NOTIFICATION BY AN INVITER OF AN INFORMATION ON A PAGE OF AN ADVERTISER'S SERVER

This application is the U.S. national phase of International Application No. PCT/EP2012/054820 filed 19 Mar. 2012 which designated the U.S. and claims priority to FR 1152455 filed 24 Mar. 2011, the entire contents of each of which are hereby incorporated by reference.

The present invention concerns a method and a system of notification by an inviter of an information on a page of an advertisers server to at least one contact of the inviter.

The purchase of products or services over a communication network, such as the internet, is steadily growing.

Certain sites offer promotional offers with limited duration or for a limited number of products.

The offers, such as for example those concerning holiday promotions, may interest a community or group of friends.

It is often difficult to inform friends of these offers within the time period for which these offers are available.

The object of the invention is to remedy the drawbacks of the prior art by proposing a method and a system of notification, by an inviter, of a recommendation or an information on a page of an advertiser's server, to at least one contact of the inviter, which is rapid and can be performed in real time.

To this end, according to a first aspect, the invention proposes a method of notification by an inviter of an information on a page of an advertiser's server to at least one contact of the inviter, the at least one contact and the inviter being linked together via a social network, a communication network linking the advertisers server, a social network server, a device used by the inviter, at least one device used by the contact and a sharing server, wherein the method comprises the steps performed by the sharing server of:

receiving a message from the device used by the inviter after loading a page of the advertisers server by the device used by the inviter, obtaining from the social network server information identifying at least one contact of the inviter which is currently connected to the social network server, transferring each information obtained and identifying at least one contact to the device used by the inviter, receiving, from the device used by the inviter, information identifying at least one contact selected by the inviter among transferred information identifying at least one contact, transferring a message to the contact or contacts selected by the inviter, the message comprising at least one address relating to the page loaded by the device used by the inviter.

The invention also concerns a system of notification by an inviter of an information on a page of an advertisers server to at least one contact of the inviter, the at least one contact and the inviter being linked together via a social network, a communication network linking the advertisers server, a social network server, a device used by the inviter, at least one device used by the contact and a sharing server, characterised in that the sharing server comprises:

means for receiving a message from the device used by the inviter after loading of the page of the advertiser's server by the device used by the inviter, means for obtaining, from the social network server, information identifying at least one contact of the inviter which is currently connected to the social network server, means for transferring each obtained information identifying at least one contact to the device used by the inviter, means for receiving, from the device used by the inviter, of information identifying at least one contact selected by the inviter among transferred information identifying at least one contact, means for transferring a message to the contact or contacts selected by the inviter, the message comprising at least one address relating to the page loaded by the device used by the inviter.

Thus it is possible to inform one's friends of the page content quickly.

This avoids the information being obsolete when it becomes accessible to contacts.

Furthermore by selecting only contacts who are connected to the social network server, the page address is sent only to contacts who are able to process the page quickly. The communication network is not burdened by the transfer of messages to recipients who are absent or unable to benefit from the information received.

This also allows promotion of impulse buying by the user of the inviting device and his contacts.

According to a particular embodiment of the invention, the message destined for the contact or contacts selected by the inviter is transferred via the social network server.

Thus the contacts are notified in a simple manner using contact means provided by the social network.

According to a particular embodiment, the message destined for the contact or contacts selected by the inviter is transferred using the identifier of the inviter.

Thus the contacts are notified in a simple manner using contact means provided by the social network.

According to a particular embodiment, prior to receive the message from the device used by the inviter, the sharing server transfers to the device used by the inviter a program which modifies the content of the page loaded by the inviting device, by inserting therein an icon allowing the user of the inviting device to activate the notification.

Thus integration of the present invention in the advertiser's server is simple and requires few modifications to the advertiser's server.

According to a particular embodiment, following the reception of the message from the device used by the inviter, the sharing server transfers to the device used by the inviter a program which allows definition of permissions for access to the social network by the sharing server.

Thus the sharing server, with the agreement of the inviter, can use the inviter's identity to transfer messages on the social network. Implementation of the present invention is thus simplified.

According to a particular embodiment of the invention, the sharing server produces statistics on the inviter and/or the number of inviters or the contacts of the inviter who have accessed the page of the advertiser's server.

Thus it is possible to provide the advertiser with information on traffic and/or purchases, visits or other actions performed by the inviter and invited party.

According to a particular embodiment of the invention, the advertiser first registers to the sharing server and indicates the address of a target page to the sharing server.

Thus various parameters for implementation of the present invention can be set by the advertiser according to his needs.

According to a particular embodiment of the invention, the method also comprises the steps performed when the user of the invited device activates the address relating to the page loaded by the device used by the inviter, of:

redirecting the invited device by the social network server to a page of the sharing server, redirecting the invited device by the sharing server to the target page of the advertiser's server.

Thus the present invention can be implemented in a simple manner without the advertiser's server 30 and/or the social network server being modified to any significant extent.

The invention also concerns computer programs stored on an information support, said programs comprising instructions allowing implementation of the methods described above when loaded and executed by a computer system.

The characteristics of the invention mentioned above and others will appear more clearly from reading the description below of an embodiment example, said description being produced in relation to the attached drawings in which.

Figure 1:
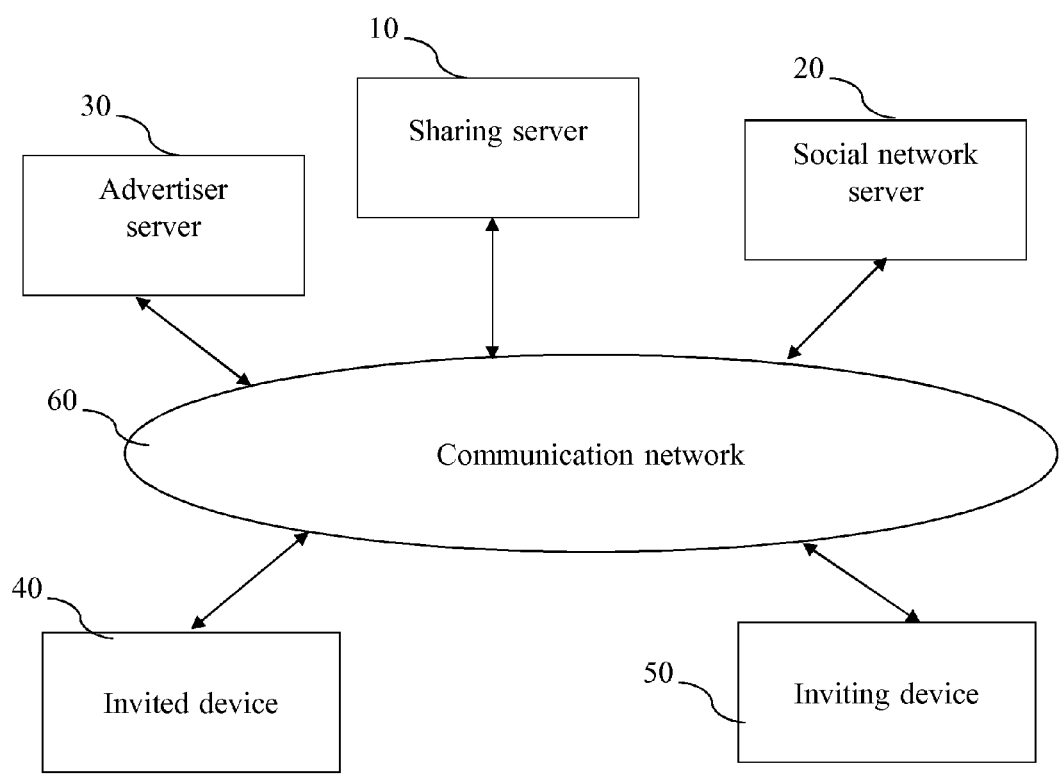
FIG. 1 shows a sharing system according to the present invention.

A sharing server 10 is linked via a communication network 60 to at least one advertiser's server 30, to a social network server 20, to a device 50 used by an inviter, and to a device 40 used by a contact of the inviter.

The device used by an inviter will be referred to below as the inviting device 50 and the device used by the contact of the inviter will be referred to below as the invited device 40.

The social network server 20 is for example a server of the social network of the Facebook© type or an instant messaging server such as that supplied by Yahoo©. The purpose of the social network server 20 is to link together persons connected to the social network server 20 and who have a recognised link between them, and to allow the exchange of instantaneous messages between them.

The advertiser's server 30 is for example a server which accommodates a site selling products, travel or services.

The communication network 60 is for example an Internet-type network, a mobile telephony network or a combination of several different networks.

The inviting and invited devices are, for example and without being limitative, computers or mobile telephones, smart phones able to access the social network server 20, such as electronic notebooks or electronic tablets which are configured to access the communication network 60.

According to the present invention, the sharing server 10:
receives a message from the device used by the inviter after loading of the page of the advertiser's server by the device used by the inviter,
obtains from the social network server information identifying at least one contact of the inviter who is connected to the social network server,
transfers each information obtained and identifying at least one contact to the device used by the inviter,
receives from the device used by the inviter information identifying at least one contact selected by the inviter among information transferred identifying at least one contact,
transfers a message to the contact or contacts selected by the inviter, the message comprising at least one address relating to the page loaded by the device used by the inviter.

Figure 2:
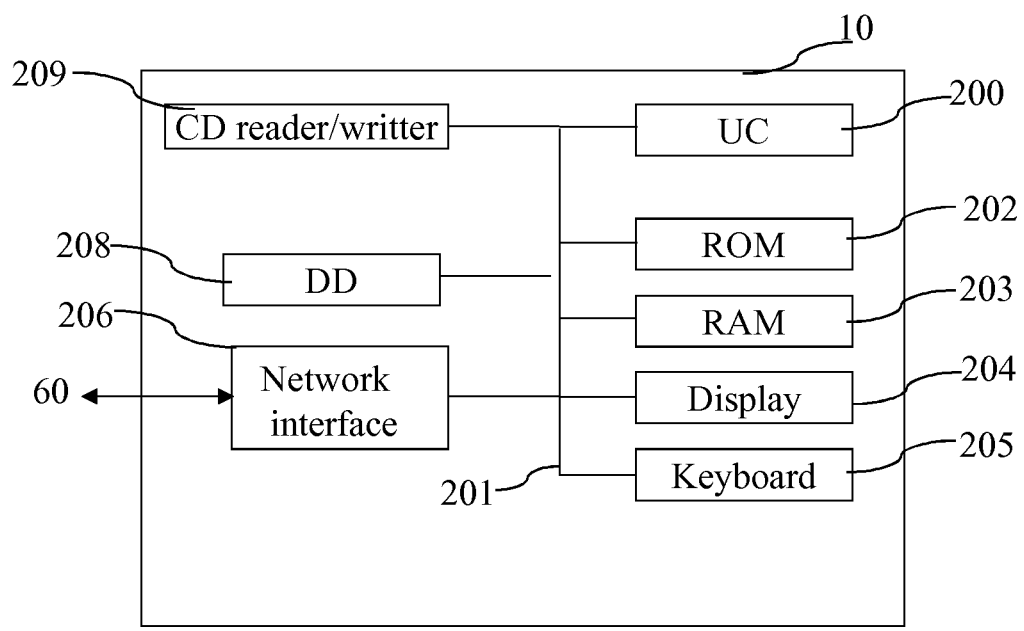
FIG. 2 shows a sharing server according to the present invention.

FIG. 2 shows a sharing server according to the present invention.

The sharing server 10 is for example a computer comprising a communication bus 201 to which are connected a central unit UC 200, a read-only memory ROM 202, a random access memory RAM 203, a network interface 206 with the communication network 60, a hard disk DD 208, and when applicable a screen 20, a keyboard 205 and a data reading/writing device Lect/Enr 209 on a removable support.

It should be noted here that as a variant, the sharing server 10 comprises one or more dedicated integrated circuits which are able to implement the method as described with reference to FIGS. 4a and 4b.

The read-only memory ROM 202 stores amongst others the programs implementing the method according to the invention, which will be described below with reference to FIGS. 4a and 4b.

More generally, the programs according to the present invention are stored in a storage medium. This storage medium can be read by a computer or microprocessor 200. This storage medium is integrated or not integrated in the sharing server 10 and may be removable.

When the sharing server 10 is powered up, the programs according to the present invention are transferred from the read-only memory ROM 202 to the random access memory RAM 203, which then contains the executable code of the invention and the data necessary for implementing the invention.

The network interface 206 allows the exchange of data with the various servers and devices via the telecommunications network 60.

The network interface 206 allows the transmission of data sets to the receiver device 20 via the telecommunications network 50.

The data reader/writer 209 on a removable storage medium is for example a reader/writer on a CD or DVD or Blu-Ray© support. The data reader/writer 209 is able to read programs according to the present invention in order to transfer them to the hard disk 208.

Figure 3:
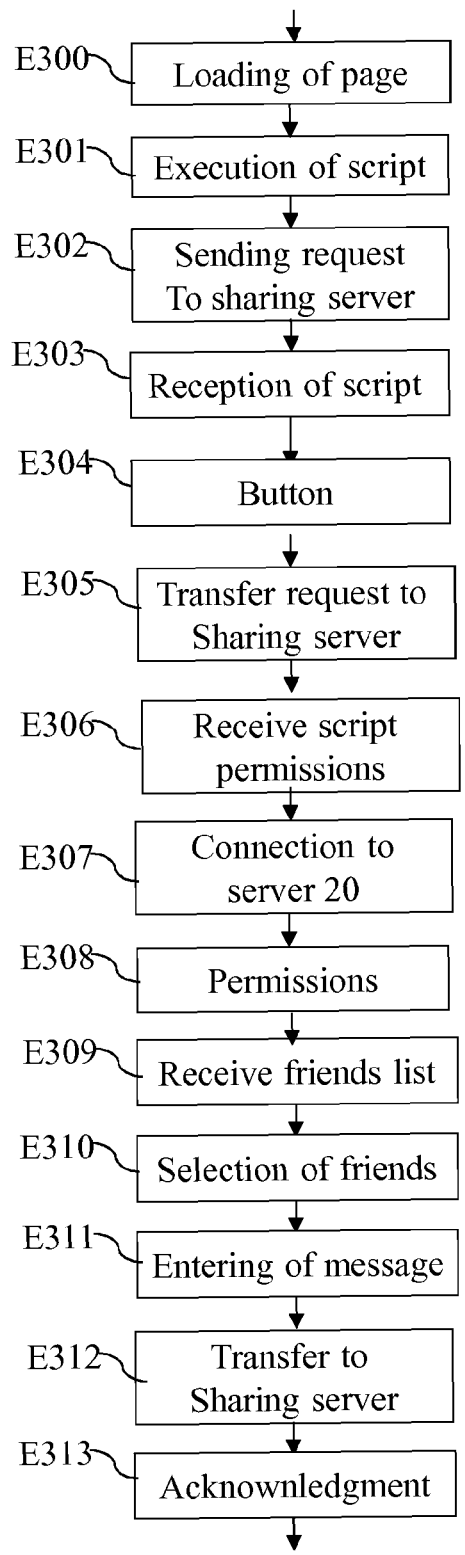
FIG. 3 shows an algorithm executed by an inviting device according to the present invention.

FIG. 3 shows an algorithm executed by an inviting device according to the present invention.

At step E300, the browser of the inviting device downloads a web page from the advertiser's server 30. The webpage is for example an on-line product sales page and comprises a script or computer program executed by the browser.

At next step E301, the browser of the inviting device 50 executes the script received in step E300, and in step E302 sends a message to the sharing server 10.

At next step E303, the browser receives in response a program which modifies the content of the loaded page by inserting therein an icon or button allowing the user of the inviting device 50 to activate the sharing process according to the invention. The program also inserts a tracer which allows monitoring of the number of displays of the button inserted. The tracer is for example an image of size 1 pixel by 1 pixel which is inserted in the loaded page.

At next step E304, the activation by the user of the inviting device 50 of the notification process according to the invention is detected.

The user of the inviting device activates the method according to the present invention by clicking on or selecting the icon inserted in the loaded page.

At next step E305, the browser sends an activation request to the sharing server 10.

At next step E306, the browser receives in response a program from the sharing server 10 which allows the establishment of permissions for access to the social network by the sharing server 10.

At next step E307, the browser establishes a connection to the social network if this has not already been established. During this connection the identifier and password of the user of the inviting device 50 are communicated to the social network server 20.

At next step E308, the program received in step E306 verifies whether the user of the inviting device 50 has given the social network server 20 the permissions necessary for implementation of the present invention by the sharing server 10. At that step the identifier of the sharing server 10, defined on registration on the sharing server 10 with the social network server 20, is transferred to the social network server 20 to verify the permissions.

If the permissions have already been given, the algorithm moves onto step E309. If not, at step E308, the inviting device receives from the social network server 20 a request for the user of the inviting device 50 to give the necessary permissions for implementation of the present invention by the sharing server 10.

At next step E309, the browser receives from the sharing server 10 the list of all contacts of the user of the inviting device 50 who are connected to the social network server 20.

At next step E310, the user of the inviting device 50 selects at least one of his contacts who is currently connected to the social network server.

At next step E311, the user of the inviting device 50 may enter a text destined for the contact or contacts selected.

At next step E312, the browser transfers a message for the sharing server 10 and comprising the identifier of the user of the inviting device on the social network server 20, the identifiers of the contacts selected, the date of the invitation and eventually the message entered.

At next step E313, the browser receives an acknowledgement of receipt from the sharing server 10.

Figure 4B:
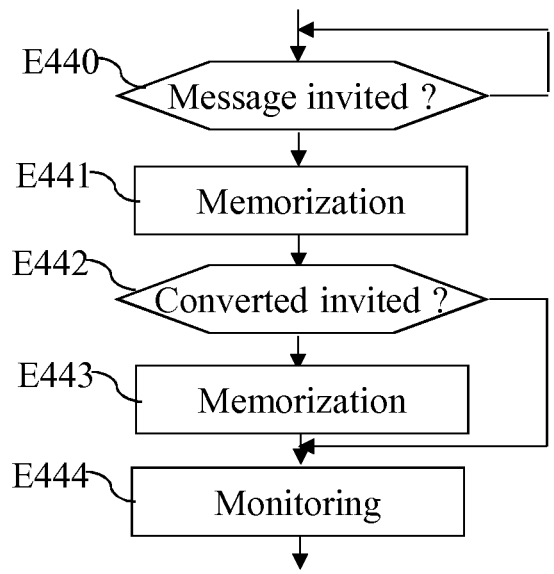
FIGS. 4a and 4b show algorithms executed by the sharing server according to the present invention.
Figure 4A:
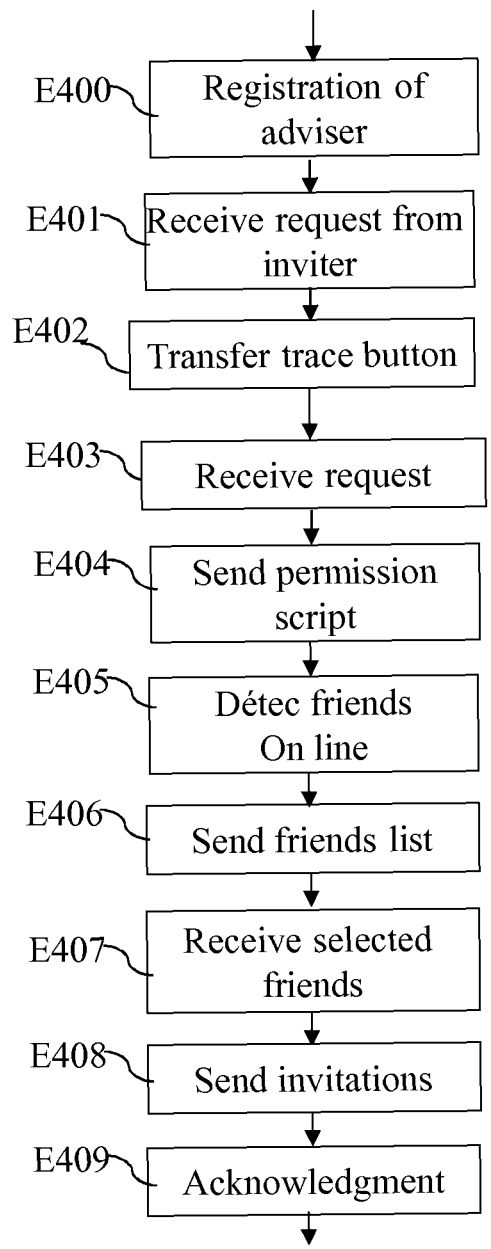

FIGS. 4a and 4b show the algorithms executed by the sharing server according to the present invention.

At step E400 of the algorithm in FIG. 4a, the advertisers server 30 is registered with the sharing server 10.

The sharing server 10 memorises the domain name of the advertiser's server, the address of a redirection page, that of a target page i.e. the page to which the advertiser wishes the contacts of the user of the inviting device, or in other words the invited devices 40, to be directed, and where applicable the address of the icon or button allowing the user of the inviting device 50 or of the invited device 40 to activate the notification process according to invention.

At step E401, the sharing server 10 receives a message from the inviting device 50.

At next step E402, the sharing server 10 transfers in response to the inviting device 50 a program which modifies the content of the page loaded by the inviting device 50, by inserting therein an icon or button allowing the user of the inviting device 50 to activate the notification process according to the invention. The program also inserts a tracer which allows monitoring of the number of displays of the inserted button.

At next step E403, the sharing server receives a request for activation sent to the sharing server 10 by a user of the inviting device 50.

The sharing server 10 in step E404 transfers a program to the inviting device 50 which allows definition of permissions for access to the social network by the sharing server 10. The identifier of the sharing server 10 is thus transferred to the inviting device 50.

At next step E405, the sharing server 10 detect the contacts of the user of the inviting device who are currently connected to the social network server 20.

To do this, the sharing server 10 transfers an interrogation request to the social network server 20.

At next step E406, the sharing server 10 transfers to the inviting device 50 the list of all contacts of the user of the inviting device 50 who are connected to the social network server 20.

At next step E407, the sharing server 10 receives from the inviting device 50 a message comprising the identifier of the user of the inviting device 50 on the social network server 20, the identifiers of the contacts selected and where applicable the message entered.

The sharing server 10 memorises the identifier of the user of the inviting device 50 on the social network server 20, the identifiers of the contacts selected, the date of invitation, the identifier of the advertisers server and the page for which the message was transferred in step E402.

At next step E408, the sharing server 10 transfers a message to each contact selected as a user of an invited device 40.

The message comprises the address of the target page and where applicable the message entered.

To do this the sharing server 10 uses the identifier of the user of the inviting device 50 on the social network server 20 and the identifier of each contact selected.

According to a particular embodiment of the invention, the sharing server 10 uses the identifier of the user of the inviting device 50 to contact the social network server 20 and submit to the social network an invitation to each contact selected.

The social network server 20 memorises the invitation message comprising the clickable link pointing to the target page of the advertiser's server 30, and where applicable a predefined message and/or the message entered by the user of the inviting device 50 for all contacts selected.

The social network server 20 transfers an invitation message, comprising the address of the target page and where applicable a predefined message from the advertiser's server and/or the message entered, to each contact selected.

As a variant, the invited device 40 regularly interrogates the social network server 20 and recovers the message amongst up-date information.

The message is displayed in an instant messaging window on the invited device 40.

When the user of the invited device 40 clicks on or selects the link of the invitation message, he is redirected by the social network server 20 to a page of the sharing server 10.

In response, the sharing server 10 redirects the invited device to the target page of the advertisers server and transfers to the invited device 40, if not already contained in the invited device 40, a program which modifies the content of the page loaded by the invited device 40, by inserting therein an icon or button allowing the user of the inviting device 50 to activate the notification process according to the invention and/or which will notify the sharing server of activation by the user of the invited device 40 of the notification process according to the present invention or the conversion of the user of the invited device 40. The program also inserts a tracer which allows monitoring of the number of displays of the inserted button.

At next step E409, the sharing server transfers an acknowledgement of receipt to the inviting device.

At step E440 of the algorithm in FIG. 4b, the sharing server 10 detects the receipt of at least one message accepting the invitation by a selected contact.

At next step E441, the sharing server 10 memorises the identifier of the contact who sent the receipt message in step E440, information allowing identification of the accepted invitation, and the date on which the message was received in step E440.

In a particular embodiment of the present invention, the sharing server 10 verifies at step E442 whether the contact who sent the receipt message in step E440 has been converted.

A contact is considered converted if, following receipt of the invitation, he has proceeded to register or make a purchase on the advertisers server 30.

The sharing server 10 verifies whether the contact who sent the receipt message in step E440 has been converted, by verifying whether a message indicating conversion has been transferred by the advertisers server to the sharing server 10.

If the contact who sent the receipt message in step E440 has been converted, the sharing server 10 proceeds to step E443. If not, the sharing server 10 proceeds to step E444.

At step E443, the sharing server 10 memorises information identifying the converted contact.

At step E444, the sharing server 10 monitors the information stored during execution of the algorithms in FIGS. 4*a* and 4*b*.

For example the sharing server 10 produces statistics on the user of an inviting device.

The sharing server 10 produces statistics on the number of invitations sent which originate from the user of the inviting device and which have been accepted and/or which have led to a conversion.

The sharing server 10 produces statistics on the number of inviting or invited devices which have accessed the target page of the advertiser's server, the number of contacts of the inviter, the number of contacts connected to the social network server at the same time as the user of the inviting device, the number of accesses to the target page, and the speed with which the contacts of the inviter accessed the target page.

Naturally the present invention is in no way limited to the embodiments described here but on the contrary includes any variant within the scope of the person skilled in the art and in particular the combination of the various embodiments of the present invention.

The invention claimed is:

1. A method of notification by an inviter of information on a page of a first server to at least one contact of the inviter, the at least one contact and the inviter being linked together via a social network, a communication linking the first server, a second server, a device used by the inviter, at least one device used by the contact and a third server, wherein the method comprises the steps of:

loading, by a browser of the device used by the inviter, the page from the first server, the page comprising a script;

executing, by the device used by the inviter, the script and transferring, by the device used by the inviter, a message;

receiving, by the third server through the communication network, the message from the device used by the inviter;

transferring, by the third server to the device used by the inviter, a program modifying the content of the page loaded by the inviting device by inserting therein an icon allowing the user of the inviting device to activate a notification;

detecting, by the device used by the inviter, an activation of the icon and sending to the third server an activation request;

receiving, by the device used by the inviter, a program from the third server allowing the establishment of permissions for access by the third server to the second server;

establishing, by the browser, a connection to the second server;

receiving, by the inviting device, a request from the second server to give permission to the third server to access the second server;

obtaining, by the third server, from the second server, information identifying only contacts of the inviter who are currently connected to the second server and that are able to process the page upon the reception of a message destined to the contacts;

transferring, by the third server, to the device used by the inviter and through the communication network, information identifying only contacts of the inviter who are currently connected to the second server and that are able to process the page upon the reception of the message destined to the contacts;

detecting, by the device used by the inviter, a selection of at least one contact of the inviter who is currently connected to the second server and that is able to process the page upon the reception of the message destined to the contact;

transferring, by the device used by the inviter, to the third server and through the communication network, information identifying the at least one contact selected by the inviter;

receiving, by the third server, information identifying the at least one contact selected by the inviter; and transferring, by the third server, to the second server and through the communication network, the message destined for the contact or contacts selected by the inviter, the message comprising at least one address of the page loaded by the device used by the inviter.

2. The method according to claim 1, wherein the message intended for the contact or contacts selected by the inviter is transferred using the identifier of the inviter.

3. The method according to claim 1, wherein the method further comprises the step of producing statistics on at least one of the inviter and the number of inviters or contacts of the inviter who have accessed the page of the first server.

4. The method according to claim 1, wherein the method further comprises a prior step of registration of the first server with the third server, and of indication of the address of a target page on the third server.

5. The method according to claim 1, wherein the method further comprises the steps, performed when the user of the invited device activates the address relating to the page loaded by the device used by the inviter, of:

redirecting the invited device, by the second server, to a page of the third server; and redirecting the invited device, by the third server, to the target page of the first server.

* * * * *